(12) United States Patent
Royle (10) Patent No.: US 6,642,796 B2
(45) Date of Patent: Nov. 4, 2003

(54) DIGITAL PHASE-QUADRATURE OSCILLATOR (75) Inventor: John M. Royle, Broadclyst (GB)

(73) Assignee: Radiodetection Limited, Bristol (GB)

( * ) Notice: Subject to any disclaimer, the term of this patent is extended or adjusted under 35 U.S.C. 154(b) by 0 days.

(21) Appl. No.: 10/076,103

(22) Filed: Feb. 15, 2002

(65) Prior Publication Data

US 2003/0155983 A1 Aug. 21, 2003

(51) Int. Cl.[7] .................................................. H03L 7/00
(52) U.S. Cl. ...................................... 331/1 A; 331/183
(58) Field of Search ................................ 331/1 A, 109, 331/115, 135, 136, 177 R, 182, 183

(56) References Cited

U.S. PATENT DOCUMENTS

| 3,870,989 | A | * | 3/1975 | Mallet ............................. 367/3 |
|---|---|---|---|---|
| 4,219,170 | A | * | 8/1980 | Esker ............................ 244/3.14 |
| 4,238,715 | A | * | 12/1980 | Parsch et al. ................... 318/135 |
| 4,618,261 | A | * | 10/1986 | Flanders et al. ................ 356/505 |
| 5,140,474 | A | * | 8/1992 | Kahlman et al. ................. 360/40 |
| 5,619,154 | A | * | 4/1997 | Strolle et al. .................. 327/129 |
| 5,714,911 | A | * | 2/1998 | Gilbert ............................ 331/57 |
| 5,850,182 | A | * | 12/1998 | Schuler .......................... 340/578 |
| 5,852,529 | A | * | 12/1998 | Ko et al. ..................... 360/77.14 |

* cited by examiner

Primary Examiner—Timothy P. Callahan
Assistant Examiner—Cassandra Cox
(74) Attorney, Agent, or Firm—Baker & Hostetler LLP (57) ABSTRACT A digital phase-quadrature oscillator generates a series of sine values representative of a sine wave, and a series of cosine values representative of a cosine wave. In each iteration of the oscillator, a sum of the squares of past sine and cosine values is used as a negative feedback term in synthesizing next sine and cosine values, in order to stabilize the amplitudes of the sine and cosine values.

15 Claims, 6 Drawing Sheets

DIGITAL PHASE-QUADRATURE OSCILLATOR

BACKGROUND OF THE INVENTION

1. Field of the Invention

The present invention relates to oscillators.

2. Related Art

Many signal processing applications require real-time sine and cosine waveforms that are phase-locked in a quadrature relationship to one another. That is, the sine and cosine waveforms differ in phase from one another by 90 degrees. One such application is a radio receiver used to locate underground cables based on a magnetic signal transmitted from the cables. The radio receiver may include one or more frequency down-conversion stages (that is, heterodyning stages) to establish highly selective intermediate frequency (IF) and/or baseband signals. The heterodyning stages often use the above-mentioned sine and cosine signals to establish both in-phase (I) and quadrature (Q) IF and/or baseband signals.

One conventional oscillator capable of generating sine and cosine waveforms is based on a model of Simple Harmonic Motion (for example, using a model of a perfect spring-mass system with no damping). Typically, this oscillator requires a closed-loop including two series integrators and a negative feedback term. A frequency that solves for a loop gain equal to "−1" determines an output frequency of the oscillator. One problem with this oscillator is that it is difficult to phase-lock the output sine and cosine signals in quadrature phase.

Another conventional oscillator is based on an unstable Infinite Impulse Response (IIR) filter. This is highly efficient computationally, but is limited by spectral distortion and difficulty in maintaining two phase-locked outputs.

Another known oscillator is based on a mathematical expansions of the terms sin(a+b) and cos(a+b). It is possible to construct a closed-loop coupled oscillator having a reasonably stable frequency output for two components (that is, the sine and cosine signals) phase-locked in quadrature with each other. When this approach is implemented using floating point arithmetic, Mantissa truncation leads to amplitude instability after many iterations. This problem worsens as floating point field widths become smaller, for example, when using a floating point field width of 32-bits. One known technique for reducing the amplitude instability is to implement a zero-crossing detector to reset amplitudes. This technique may be implemented on each signal zero-crossing or after a fixed number of oscillations. Although this technique improves long-term amplitude stability, the amplitude resetting process is non-linear, and disadvantageously causes undesired spectral distortion.

Therefore, there is a need for an oscillator that generates sine and cosine signals that are phase-locked to one another and separated in phase from one another by 90 degrees. There is a further need for such an oscillator to overcome the above-mentioned problems with known oscillators, such as amplitude instability and spectral distortion.

SUMMARY OF THE INVENTION

The present invention is directed to a quadrature oscillator that overcomes the problems in the prior art, mentioned above. The quadrature oscillator of the present invention produces sine and cosine waveforms that are phase-locked in quadrature to one another and have stabilized amplitudes. The sine and cosine waveforms each have improved spectral purity compared to known quadrature oscillators. The oscillator of the present invention is based on the expansions of sin(a+b) and cos(a+b). However, the oscillator of the present invention has improved amplitude stability, phase accuracy, and spectral purity, compared to known oscillators, such as the zero-crossing reset oscillator mentioned above. For example, in an application of the oscillator of the present invention, the oscillator improves receiver selectivity by as much as 25 decibels (dB) over the amplitude resetting type of oscillator mentioned above.

The oscillator of the present invention uses a resultant vector magnitude $(\sin^2(\theta)+\cos^2(\theta))$ from a previous iteration of the oscillator to act as negative feedback on an oscillator loop gain. The resultant magnitude represents stabilizes the amplitudes of the sine and cosine outputs of the oscillator.

An embodiment of the present invention is a method generating quadrature related waveforms. The method comprises generating a sine value, generating a cosine value, generating a magnitude value A equal to a sum of the squares of the sine value and the cosine value, and generating a negative feedback value as a function of the sine value, the cosine value, and the magnitude value. The method further comprises generating a next sine value using the sine value and the negative feedback value. The method further comprises repeating the just mentioned steps to generate a series of sine values representative of a sine wave. Further method steps result in generating a series of cosine values representative of a cosine wave. In an example application of the present invention, the sine and cosine waves are used in heterodyning stages of a locator receiver, to generate IF and/or baseband I and Q receiver signals.

Further embodiments of the present invention include a system and a computer program product for performing the above described method.

Further method, system and computer program product embodiments will become apparent from the ensuing description of the present invention.

BRIEF DESCRIPTION OF THE DRAWINGS/FIGURES

The present invention is described with reference to the accompanying drawings. In the drawings, like reference numbers indicate identical or functionally similar elements.

DETAILED DESCRIPTION OF THE INVENTION

First, a mathematical treatment of the present invention is provided below. Then, the present invention is described in connection with FIGS. 1–4. The oscillator of the present invention generates/produces a sine waveform (also referred to as a signal) and a cosine waveform, each having a desired frequency fsyn. The sine waveform includes a series of sine values, each of the sine values being separated from a preceding one of the sine values by a constant phase increment δ. Similarly, the cosine waveform includes a series of cosine values separated by the phase increment δ.

The oscillator of the present invention uses an iterative technique to generate the sine and cosine waveforms. A current iteration generates/produces a sine value=sin(θ), and a cosine value=cos(θ). A next iteration of the present invention produces a next sine value=sin(θ+δ), and a next cosine value=cos(θ+δ). Phase increment δ is given by:

$$\delta = \frac{2 \cdot \pi \cdot fsyn}{Fs}$$

where fsyn is the desired frequency of the sine and cosine waves, and

Fs is a sampling frequency, that is, the rate at which iterations are performed in the present invention.

First and second seeds α and β (also referred to as seed values α and β) are used in the present invention to establish an oscillator loop gain. The oscillator loop gain establishes, in part, a common frequency of the sine and cosine waveforms. Seed values α and β are given by:

$$\alpha = 2.\sin^2 \delta/2$$

$$\beta = \sin \delta$$

The expressions for the next sine value (that is, sin(θ+δ)) and the next cosine value (that is, cos(θ+δ)) can each be expanded using the trigonometric expansions below:

$$\sin(\theta+\delta) = \sin(\theta).\cos(\delta) + \cos(\theta).\sin(\delta)$$

$$\cos(\theta+\delta) = \cos(\theta).\cos(\delta) - \sin(\theta).\sin(\delta)$$

From the expansions above, it follows that the two quadrature phase components (that is, values) sin(θ+δ) and cos(θ+δ) can be calculated according to the following:

$$\sin(\theta+\delta) = \sin(\theta) - [A.\alpha. \sin(\theta) - \beta. \cos(\theta)]$$

$$\cos(\theta+\delta) = \cos(\theta) - [A.\alpha. \cos(\theta) + \beta. \sin(\theta)]$$

where $A = \sin^2(\theta) + \cos^2(\theta)$

A is a resultant scalar amplitude (or magnitude value) corresponding to the respective sine and cosine values sin(θ) and cos(θ) immediately preceding the respective next sine and next cosine values sin(θ+δ) and cos(θ+δ). In other words, the next sine and cosine values are a function of a sum of the squares of the preceding sine and cosine values.

Figure 1:
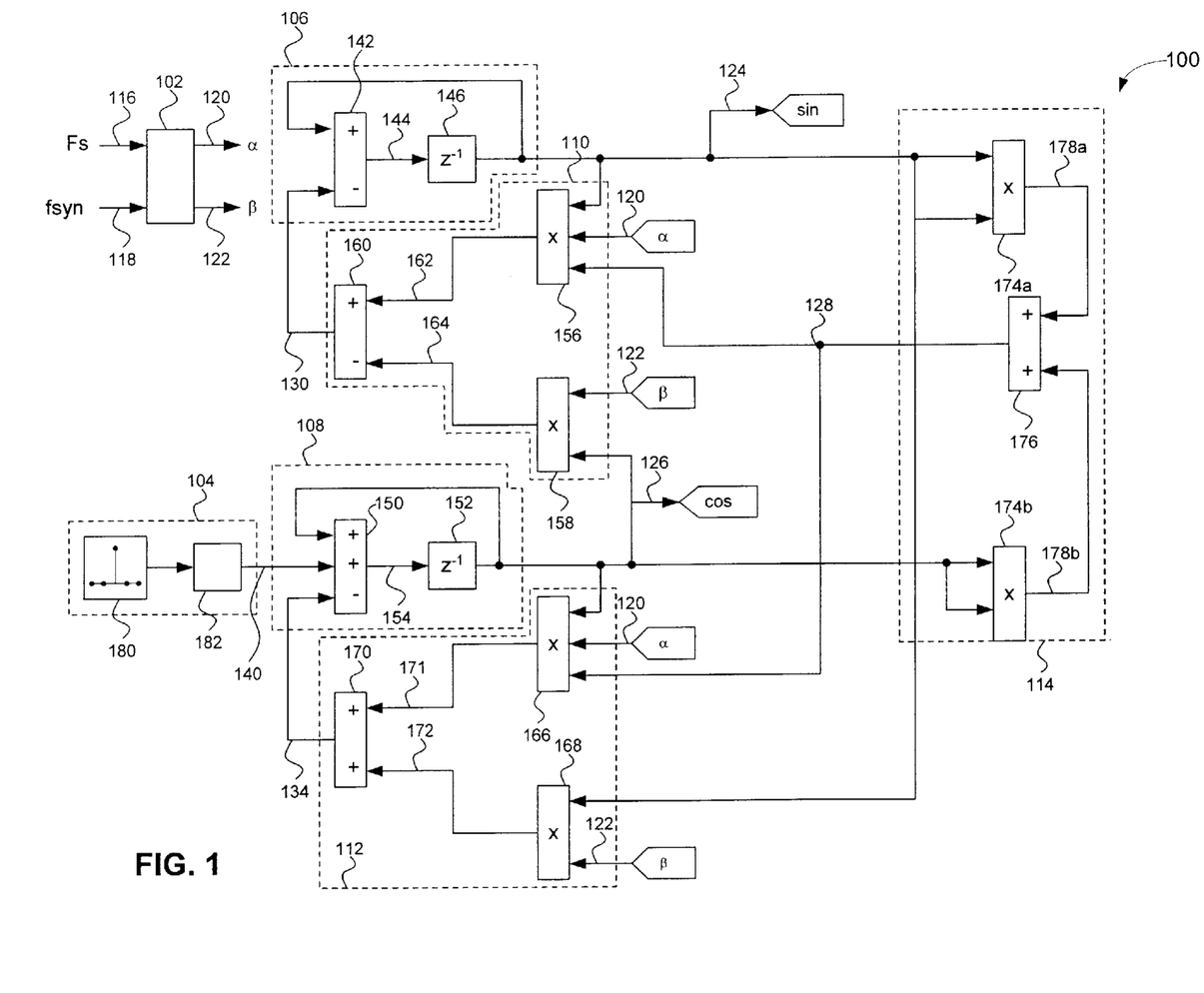
FIG. 1 is a block diagram of an example phase-quadrature oscillator.

FIG. 1 is a block diagram of an example phase-quadrature oscillator 100. Oscillator 100 includes the following high-level functional elements: a seed generator 102; an initial impulse generator 104; first and second integrators 106 and 108; first and second feedback generators 110 and 112; and a magnitude generator 114.

Seed generator 102 receives a predetermined sampling frequency value 116 (that is, sampling frequency value Fs) and a desired signal frequency value 118 (that is, desired output waveform frequency fsyn) from an external source, not shown. Seed generator 102 produces (that is generates) a first seed 120 (that is, seed value (t) and a second seed 122 (that is, seed value β) from input values 116 and 118. Seed generator 102 is described further in connection with FIG. 2, below.

Except where mentioned below, oscillator 100 is now described in the context of a steady state operation thereof.

In the steady state, oscillator 100 continuously iterates to generate successive sine and cosine samples representative of respective sine and cosine waveforms. In a current iteration, integrator 106 generates a sine value 124 (that is, sin(θ)) of a sine waveform. Similarly, integrator 108 generates a cosine value 126 (that is, cos(θ)) of a cosine waveform. Magnitude generator 114 generates a magnitude value 128 equal to a sum of the squares of sine and cosine values 124 and 126 (that is, $A = \sin^2(\theta) + \cos^2(\theta)$). Oscillator 100 iterates at a rate equal to the sampling frequency Fs.

Feedback generator 110 generates a negative feedback signal 130 as a function of sine and cosine values 124 and 126, and as a function of magnitude value 128. Feedback generator 110 also uses seeds 120 and 122 to generate negative feedback signal 130. Feedback generator 110 generates negative feedback signal 130 in accordance with the equation:

$$A.\alpha.\sin(\theta) - \beta.\cos(\theta)$$

Integrator 106 generates a next sine value (that is, sin(θ+δ)) using sine value 124 and negative feedback signal 130. Magnitude value 128 (that is, $\sin^2(\theta) + \cos^2(\theta)$) acts as negative feedback on the loop gain of oscillator 100, to stabilize the amplitudes of the sine and cosine values.

Similar to feedback generator 110, feedback generator 112 generates a negative feedback signal 134 as a function of sine and cosine values 124 and 126, and as a function of magnitude value 128. Feedback generator 112 also uses seeds 120 and 122 to generate negative feedback signal 134. Feedback generator 112 generates negative feedback signal 134 in accordance with the equation:

$$A.\alpha.\cos(\theta) + \beta.\sin(\theta)$$

In turn, integrator 108 generates a next cosine value (that is, cos(θ+δ)) based on negative feedback value 134 and cosine value 126.

The process described above repeats with each iteration of oscillator 100. Therefore, oscillator 100 produces successive sine values sin(θ+nδ) and cosine values cos(θ+nδ), where n=0, 1, 2, 3, . . . , etc.

The steady state operation of oscillator 100 is described above in the context of current sine and cosine values, and next sine and cosine values that depend on the current sine and cosine values. It is to be understood that if the current sine and cosine values above are considered to be past sine and cosine values (instead of current values), then the next sine and cosine values above can be considered to be current sine and cosine values (instead of next values) that depend on the past sine and cosine value. Either way, the resultant operation of oscillator 100 is the same.

Impulse generator 104 generates an initial impulse 140, and applies the impulse to integrator 108 to initiate operation of oscillator 100, as mentioned above.

The high-level functional elements described above are now described in further detail. Integrator 106 includes a combiner 142 for subtracting negative feedback value 130 from sine value 124 to produce an intermediate value 144. Integrator 106 includes a unit delay 146 following combiner 142. Unit delay 146 delays signal 144 by a single clock cycle. Similarly, integrator 108 includes a combiner 150 and a unit delay 152 following the combiner. Combiner 150 subtracts negative feedback value 134 from cosine value 126 to produce an intermediate value 154. Unit delay 152 delays unit value 154 by one clock cycle. Combiner 150 also receives initial impulse 140 from initial impulse generator 104, to start oscillator 100 oscillating (that is, iterating), thereby causing the oscillator to enter the steady state.

Feedback generator 110 includes first and second multipliers 156 and 158, which feed a combiner 160. Multiplier 156 multiplies together magnitude value 128, seed 120, and sine value 124 to produce an intermediate value 162. Multiplier 158 multiplies together seed 122 and cosine value 126 to produce an intermediate value 164. Combiner 160 subtracts intermediate value 164 from intermediate value 162 to produce negative feedback value 130.

Feedback generator 112 includes multipliers 166 and 168, which feed a combiner 170. Multiplier 166 multiplies together cosine value 126, seed 120, and magnitude value 128 to produce an intermediate value 171. Multiplier 168 multiplies together sine value 124 and seed 122 to produce an intermediate value 172. Combiner 170 adds together intermediate values 171 and 172 to produce negative feedback value 134.

Magnitude generator 114 includes multipliers 174*a* and 174*b*, which feed a combiner 176. Multiplier 174*a* generates a value 178*a* equal to a square of the value 124. Multiplier 174*b* generates a value 178*b* equal to a square of cosine value 126. Combiner 176 adds squared values 178*a* and 178*b* to produce magnitude value 128.

Impulse generator 104 includes an impulse source 180 followed by a variable gain stage 182.

Figure 2:
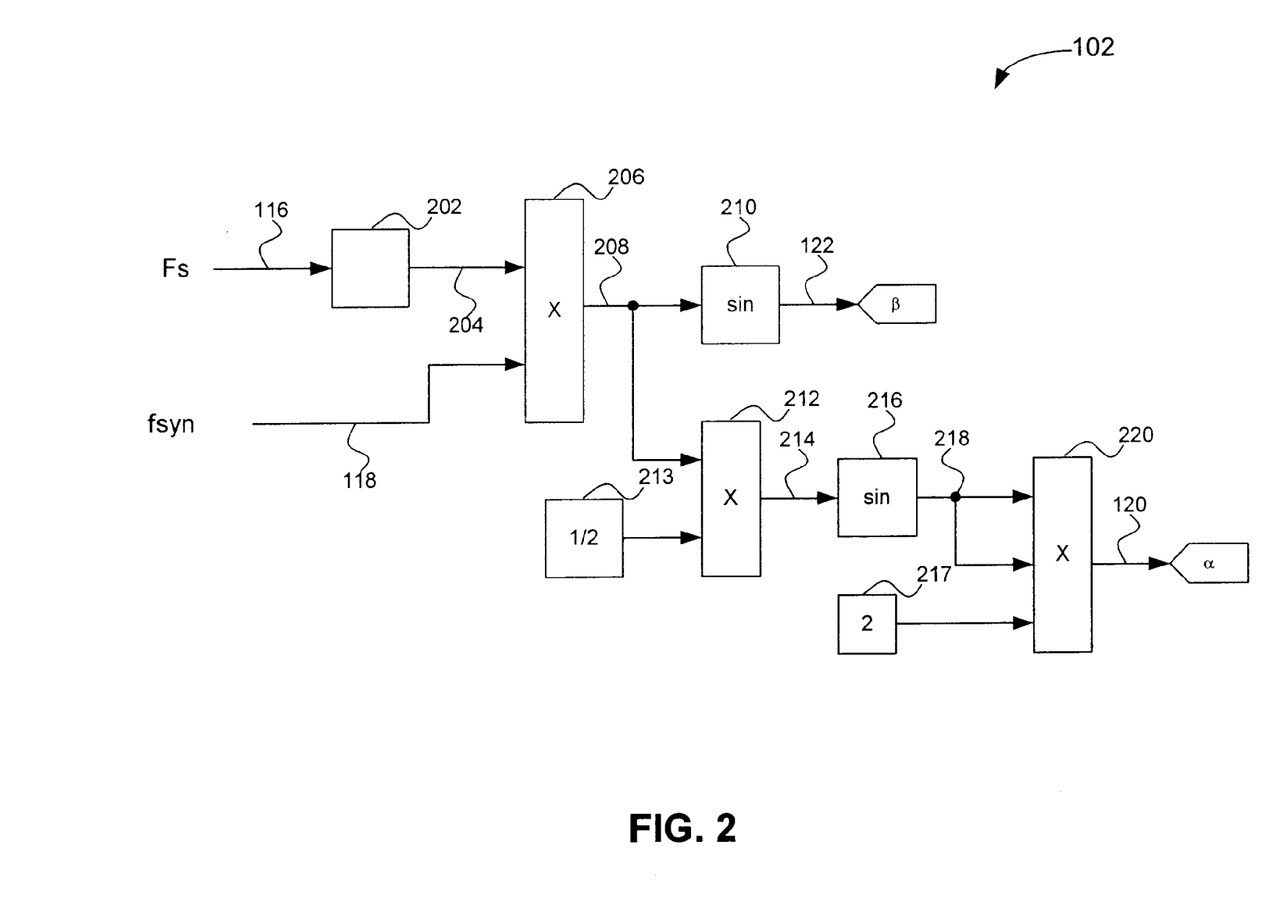
FIG. 2 is a block diagram of an example seed generator used in the oscillator of FIG. 1.

FIG. 2 is a block diagram of seed generator 102, according to an embodiment of the present invention. Seed generator 102 includes a variable gain stage 202 for weighting sampling frequency value 116, to produce a weighted frequency value 204. A multiplier 206 multiplies together weighted value 204 and desired frequency value 118, to produce a value 208. Value 208 is generated in accordance with the equation:

$$\delta = \frac{2 \cdot \pi \cdot fsyn}{Fs}$$

A sine generator 210 produces seed 122 from value 208. Also, a multiplier 212 multiplies together value 208 and a weighting value of one-half (produced by a constant generator 213) to produce a value 214. A sine generator 216 generates a value 218 from value 214. A multiplier 220 multiplies together a weighting value of two (2) (produced by a constant generator 217) and a square of value 218, to produce seed 120.

Oscillator 100 has been implemented in a 32-bit Floating-Point Digital Signal Processor. The techniques of the present invention achieve an amplitude stability in each of the sine and cosine values that is limited only by the resolution of the Mantissa component of the floating-point numbers that represent the sine and cosine values. That is, the amplitude stability is within one Least Significant Bit (LSB) in a 24-bit field, since a 32-bit floating-point number comprises a 24-bit Mantissa and an 8-bit Exponent field. The output frequency of the sine and cosine waveforms have an accuracy governed by the external clock source, that is, the source of the sampling frequency value Fs. It is possible for oscillator 100 to synthesize frequencies in the band between 0 Hz and Fs/4, where Fs is the sampling frequency or update (iteration) rate of oscillator 100. Spectral distortion caused by oscillator 100 is limited to the Mantissa LSB.

The two waveform components produced by oscillator 100 (that is, the sine waveform and the cosine waveform) are phase-locked at 90° with respect to each other. The phase angle error is limited to the LSB of the Mantissa. The oscillator runs continuously while maintaining all of the above performance criterion (such as, amplitude stability, phase error, and so on), and requires a fixed overhead of computations per iteration of the oscillator.

As described above, the present invention uses the resultant vector magnitude ($\sin^2(\theta)+\cos^2(\theta)$) (value 128) from the previous iteration of the oscillator to act as negative feedback on the oscillator loop gain, to produce current values of the sine and cosine waveforms (or equivalently, the resultant magnitude from the current iteration is used to produce the next values). The resultant magnitude is an amplitude stabilization term that ensures the output sine and cosine values (and thus, waveforms) are stable to within an LSB of the Mantissa used in representing the sine and cosine values.

Figure 3:
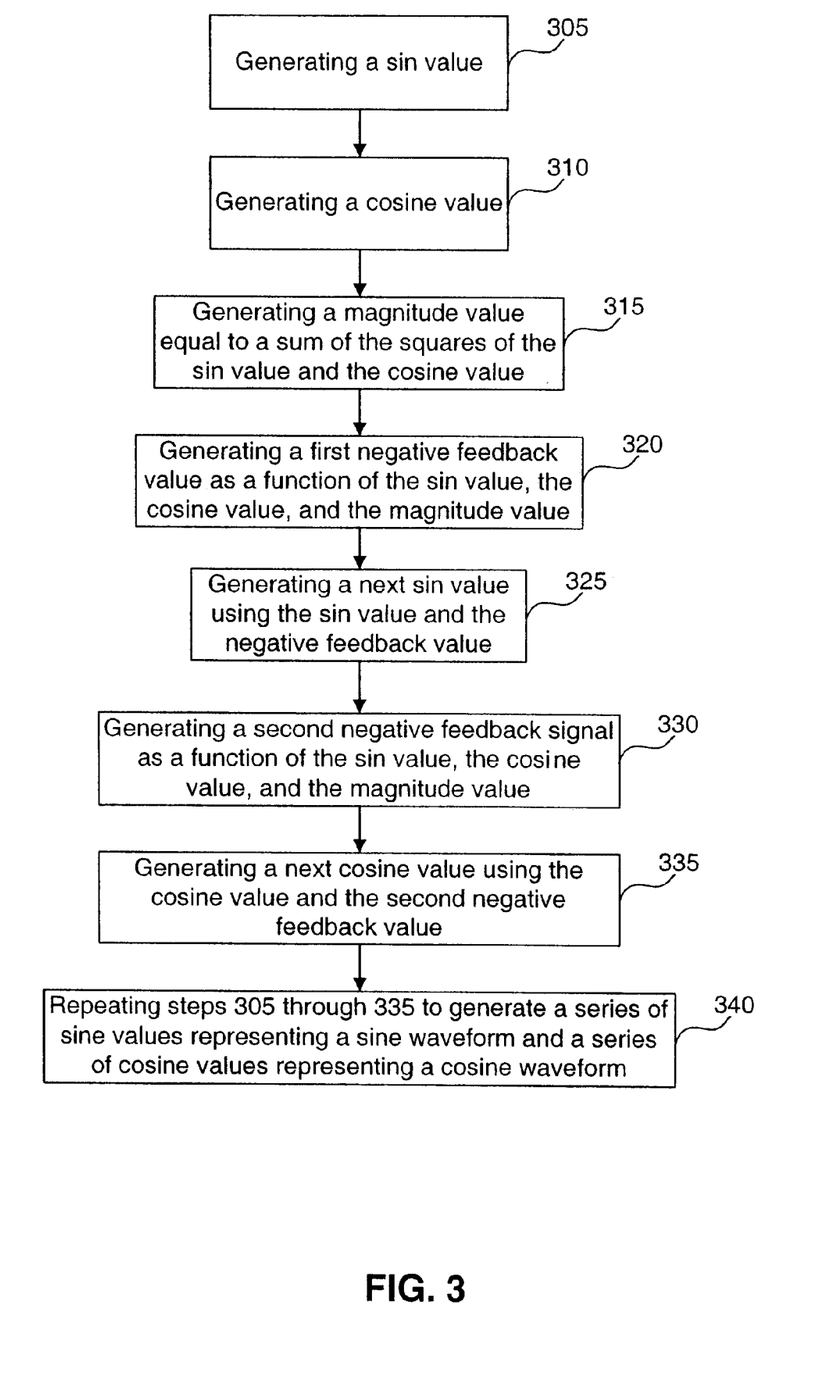
FIG. 3 is a flowchart of an example method of generating a sine and a cosine wave.

FIG. 3 is a flowchart of an example method 300 of generating a sine wave and a cosine wave, concurrently (the terms "wave" and "waveform" are used herein interchangeably). The sine and cosine waves are phase-locked to one another and are each amplitude stabilized. Method 300 includes a first step 305 that includes generating a sine value (also referred to interchangeably as a "sin value"). For example, integrator 106 generates sine value 124.

A next step 310 includes generating a cosine value. For example, integrator 108 generates cosine value 126.

A next step 315 includes generating a magnitude value equal to a sum of the squares of the sine value and the cosine value. For example, magnitude generator 114 generates magnitude value 128.

A next step 320 includes generating a first negative feedback value as a function of the sine value, the cosine value, and the magnitude value. For example, feedback generator 110 generates negative feedback signal 130.

A next step 325 includes generating a next sine value using the sine value and the first negative feedback value. For example, integrator 106 generates a next sine value using sine value 124 and negative feedback signal 130.

A next step 330 includes generating a second negative feedback signal as a function of the sine value, the cosine value, and the magnitude value. For example, feedback generator 112 generates negative feedback signal 134.

A next step 335 includes generating a next cosine value using the cosine value and the second negative feedback value. For example, integrator 108 generates the next cosine value based on cosine value 126 and negative feedback signal 134.

A next step 340 includes repeating steps 305 through 335 to generate a series of sine values representing a sine waveform and a series of cosine values representing a cosine waveform.

Other methods of the present invention are within in the scope of the present invention. For example, another method of the present invention includes some, but not all of the steps of method 300.

Figure 4:
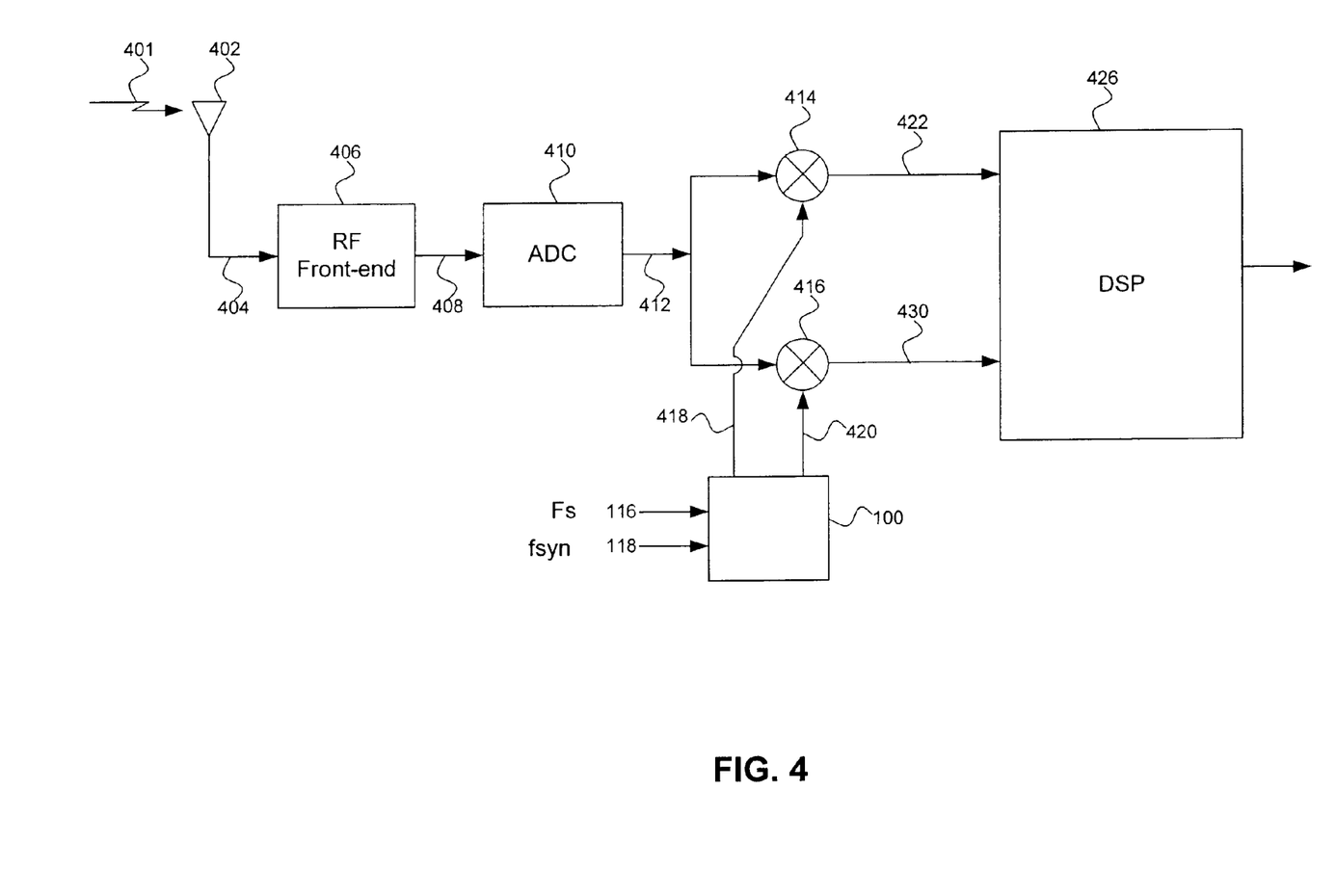
FIG. 4 is an example receiver in which the present invention can be used.

FIG. 4 is an example receiver 400 in which the present invention can be used. Receiver 400 is usable for locating an underground object (not shown in FIG. 4), such as a cable or boring tool. The underground object transmits a magnetic signal 401. Receiver 400 includes an antenna 402 for receiving magnetic signal 401, and for delivering a radio frequency (RF) signal 404 representative of the magnetic signal to an RF front-end 406. RF front-end 406 delivers an amplified and filtered RF signal 408 to an analog-to-digital converter (ADC) 410.

ADC 410 samples signal 408 to produce a digitized signal 412 including digitized signal samples. ADC 410 provides digitized signal 412 to an in-phase (I) mixer 414 and a quadrature (Q) mixer 416. Oscillator 100, described above in connection with FIGS. 1–3, provides a sine signal 418 and a cosine signal 420 to respective mixers 414 and 416. Sine signal 418 includes a series of sine values (for example, sine value 124, as described above)), and cosine signal 420 includes a series of cosine values (for example, cosine value 126, described above). Mixer 414 frequency down-converts signal 412 to an I signal 422, which may be either an IF or a baseband signal. A digital signal processor 426 processes I signal 422. Similarly, mixer 416 frequency down-converts signal 412 to a Q signal 430, which may be either an IF signal or a baseband signal, and provides the down-converted Q signal to processor 426. DSP 426 performs any number of processing functions using signals 422 and 430, such as filtering, decimation, amplitude and/or frequency demodulation, for example.

Example Implementations

A. Example Hardware/Software/Firmware Implementations

The present invention (for example, oscillator 100) can be implemented in hardware, software, firmware, and/or combinations thereof, including, without limitation, gate arrays, programmable arrays ("PGAs"), fast PGAs ("FPGAs"), application-specific integrated circuits ("ASICs"), processors, microprocessors, microcontrollers, and/or other embedded circuits, processes and/or digital signal processors, and discrete hardware logic. The present invention is preferably implemented with digital electronics but can also be implemented with analog electronics and/or combinations of digital and analog electronics.

Figure 5:
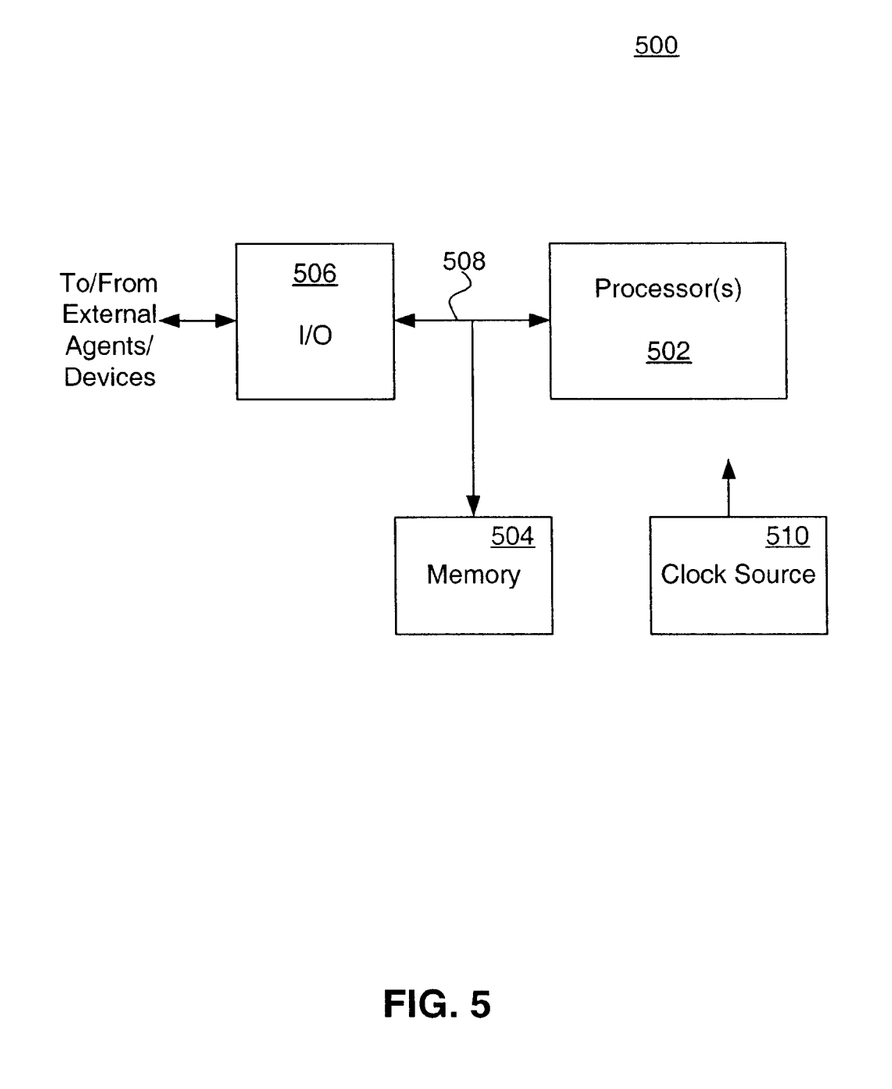
FIG. 5 is an illustration of an example processing system/environment in which the present invention can be implemented.

FIG. 5 illustrates an example processing system/environment 500, in which the present invention can be implemented. Processing system 500 includes a processor 502 (or multiple processors 502), a memory 504, an input/output (I/O) interface (I/F) 506, and a communication I/F 508 coupled between the processor, memory, and I/O I/F. System 500 may also include a local clock source 510. System 500 communicates with external agents/devices using I/O I/F 506. I/O I/F 506 can include interfaces for interfacing to external memory, external communication channels, external clocks and timers, external devices, and so on.

Memory 504 includes a data memory for storing information/data and a program memory for storing program instructions. Processor 502 performs processing functions in accordance with the program instructions stored in memory 504. Processor 502 can access data in memory 504 as needed. Additionally, or alternatively, processor 502 may include fixed/programmed hardware portions, such as digital logic, to perform some or all of the above-mentioned processing functions without having to access program instructions in memory 504.

Oscillator 100 can be implemented using processing environment 500.

For example, one or more of functional blocks 102–114 of oscillator 100 may be implemented in environment 500. Also, the processes of the present invention, for example, method 300, may be implemented using environment 500.

B. Example Computer Program Implementations

Figure 6:
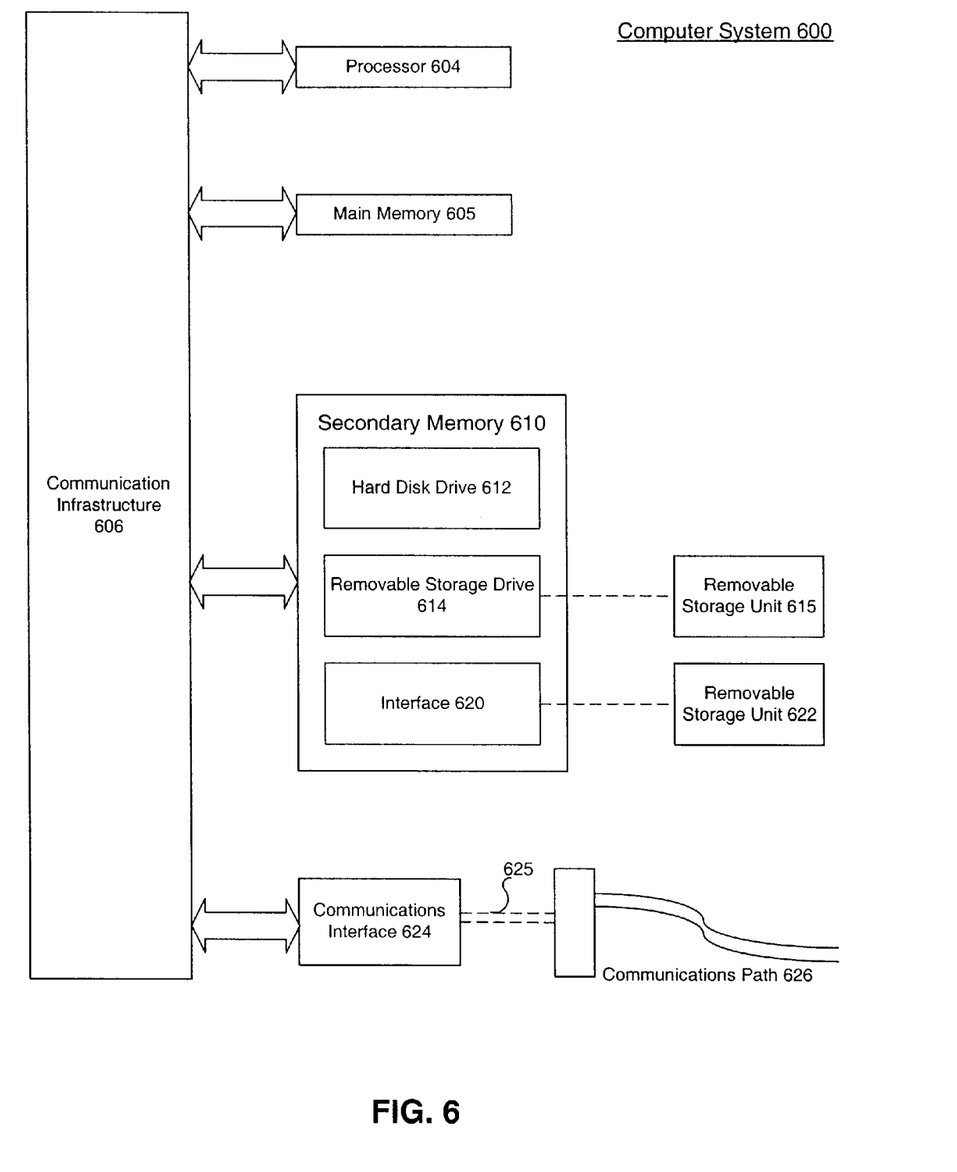
FIG. 6 is an example computer system that can be used in the present invention.

The present invention can also be implemented in computer-readable code, or software, that executes on a computer system. FIG. 6 illustrates an example computer system 600, in which the present invention can be implemented as computer-readable code. Various embodiments of the invention are described in terms of this example computer system 600. After reading this description, it will become apparent to a person skilled in the relevant art how to implement the invention using other computer systems and/or computer architectures.

In the present invention, all of the signal processing blocks of oscillator 100 (for example, blocks 102–114) can execute on one or more distinct computer systems 600, to implement the various methods of the present invention (for example, method 300). The computer system 600 includes one or more processors, such as processor 604. Processor 604 can be a special purpose or a general purpose digital signal processor. The processor 604 is connected to a communication infrastructure 606 (for example, a bus or network). Various software implementations are described in terms of this exemplary computer system. After reading this description, it will become apparent to a person skilled in the relevant art how to implement the invention using other computer systems and/or computer architectures.

Computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618, represents a floppy disk, magnetic tape, optical disk, etc. which is read by and written to by removable storage drive 614. As will be appreciated, the removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a PCM-CIA slot and card, etc. Software and data transferred via communications interface 624 are in the form of signals 628 which may be electronic, electromagnetic, optical or other signals capable of being received by communications interface 624. These signals 628 are provided to communications interface 624 via a communications path 626. Communications path 626 carries signals 628 and may be implemented using wire or cable, fiber optics, a phone line, a cellular phone link, an RF link and other communications channels.

In this document, the terms "computer program medium" and "computer usable medium" are used to generally refer to media such as removable storage drive 614, a hard disk installed in hard disk drive 612, and signals 628. These computer program products are means for providing software to computer system 600.

Computer programs (also called computer control logic) are stored in main memory 608 and/or secondary memory 610. Computer programs may also be received via communications interface 624. Such computer programs, when executed, enable the computer system 600 to implement the present invention as discussed herein. In particular, the computer programs, when executed, enable the processor 604 to implement the processes of the present invention, such as the method(s) implemented using the oscillator structure 100 described above, such as method 300, for example. Accordingly, such computer programs represent controllers of the computer system 600. By way of example, in the embodiments of the invention, the processes performed by the signal processing blocks of oscillator 100 can be performed by computer control logic. Where the invention is implemented using software, the software may be stored in a computer program product and loaded into computer system 600 using removable storage drive 614, hard drive 612 or communications interface 624.

Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof, as was described above in connection with FIGS. 5 and 6, for example. Thus, the breadth and scope of the present invention should not be limited by any of the above-described exemplary embodiments, but should be defined only in accordance with the following claims and their equivalents.

What is claimed is:

1. A method of generating quadrature related waves, comprising:
   (a) generating a sine value;
   (b) generating a cosine value;
   (c) generating a magnitude value equal to a sum of the squares of the sine value and the cosine value;
   (d) generating a negative feedback value as a function of the sine wave, the cosine value, and the magnitude value;
   (e) generating a next sine value using the sine value and the negative feedback value, whereby the next sine value represents part of a sine wave;
   (f) repeating steps (a) through (e) to generate a series of values representative of the sine wave;
   generating a first seed from a predetermined sampling frequency value and a desired signal frequency value; and
   generating a second seed from the predetermined sampling frequency value and the desired signal frequency value,
   wherein step (d) comprises generating the negative feedback value using the first and second seeds such that the first and second seeds cause the sine wave to have the desired frequency value.

2. The method of claim 1, wherein step (e) comprises generating the next sine value as a floating point number having an N-bit amplitude-mantissa field, the next sine value having an amplitude stability within a least-significant-bit of the N-bit field as a result of steps (c), (d) and (e).

3. The method of claim 2, wherein N=24.

4. The method of claim 1, further comprising:
   (f) generating a second negative feedback signal as a function of the sine value, the cosine value, and the magnitude value; and
   (g) generating a next cosine value using the cosine value and the second negative feedback value, whereby the next cosine value represents part of a cosine wave.

5. The method of claim 4, further comprising:
   (h) repeating steps (a) through (g) to generate a series of cosine values representative of the cosine wave and a series of sine values representative of the sine wave.

6. The method of claim 5, further comprising:
   generating a first seed value and a second seed value from a predetermined sampling frequency value and a desired frequency value,
   wherein step (d) comprises generating the negative feedback value using the first and second seed values, and
   wherein step (f) comprises generating the second negative feedback value using the first and second seed values such that the first and second seed values establish a common frequency of the sine and cosine waves that is equal to the desired frequency value.

7. The method of claim 4, wherein:
   step (e) comprises generating the next sine value as a floating point number having an N-bit amplitude-mantissa field including a least-significant-bit;
   step (g) comprises generating the next cosine value as a floating point number having an N-bit amplitude-mantissa field including a least-significant-bit; and
   the next sine value and the next cosine value are phase-locked to one another in quadrature and with a phase accuracy governed by the least-significant-bits of the respective sine and cosine amplitude-mantissa fields as a result of steps (c), (d), (e), (f) and (g).

8. The method of claim 1, further comprising, prior to step (a): generating an initial sine value and an initial cosine value using an initial impulse.

9. A system of generating quadrature related waves, comprising:
   means for generating a sine value;
   means for generating a cosine value;
   means for generating a magnitude value equal to a sum of the squares of the sine value and the cosine value;
   means for generating a negative feedback value as a function of the sine wave, the cosine value, and the magnitude value;
   means for generating a next sine value using the sine value and the negative feedback value, whereby the next sine value represents part of a sine wave;
   means for generating a series of values representative of the sine wave;
   means for generating a first seed from a predetermined sampling frequency value and a desired signal frequency value; and
   means for generating a second seed from the predetermined sampling frequency value and the desired signal frequency value,
   wherein the means for generating a negative feedback value comprises generating the negative feedback value using the first and second seeds such that the first and second seeds cause the sine wave to have the desired frequency value.

10. The system of claim 9, wherein the next sine value is a floating point number having an N-bit amplitude-mantissa field, the next sine value having an amplitude within a least significant-bit of the N-bit fields as result of the means for generating a magnitude value equal to a sum of the squares of the sine value and the cosine value, the means for generating a negative feedback value as a function of the sine wave, the cosine value, and the magnitude value and the means for generating a next sine value using the sine value and the negative feedback value, whereby the next sine value represents part of a sine wave.

11. A computer program product comprising computer usuable media having computer readable program code means embodied in said media for causing application programs to execute on a computer processor to generate quadrature related waves, said computer readable program code means comprising:

a first computer readable program code means for causing the processor to generate a sine value;

a second computer readable program code means for causing the processor to generate a cosine value;

a third computer readable program code means for causing the processor to generate a magnitude value equal to a sum of the squares of the sine value and the cosine value;

a fourth computer readable program code means for causing the processor to generate a negative feedback value as a function of the sine value, the cosine value, and the magnitude value, wherein the first computer readable program code means includes computer readable program code means for causing the processor to generate a next sine value using the sine value and the negative feedback value, whereby the next sine value represents part of a sine wave;

a fifth computer readable program code means for causing the processor to generate a second negative feedback signal as a function of the sine value, the cosine value, and the magnitude, wherein the second computer readable program means includes computer readable program code means for causing the processor to generate next cosine value using the cosine value and the second negative feedback value, whereby the next cosine value represents a cosine wave;

wherein the first, second third, fourth and fifth computer readable program code means perform their respective functions repeatedly to generate a series of sine values representative of the sine wave and a series of cosine values representative of the cosine wave; and a sixth computer readable program means for causing the processor to generate a first seed and a second seed from a predetermined sampling frequency and a desired frequency value.

12. The computer claim of claim 11, wherein the fourth computer readable program code is adapted to generate the negative feedback value using the first and values.

13. A system for generating quadrature related waves, comprising:

a first integrator that generates a sine value;

a second integrator that generates a cosine value;

a magnitude generator that generates a magnitude value equal to a sum of the squares of the sine value and the cosine value;

a feedback generator that generates a negative feedback value as a function of the sine value, the cosine value, and the magnitude value, wherein the integrator is adapted to generate a next sine value using the sine value and the negative feedback value, whereby the next sine value represents part of a sine wave;

a second feedback generator that generates a second negative feedback signal as a function of the sine value, the cosine value, and the magnitude value, wherein the second integrator is adapted to generate a next cosine value using the cosine value and the second negative feedback value, whereby the next cosine value represents part of a cosine wave;

wherein the first and second integrators, the magnitude generator, the feedback generator and the second feedback generator are adapted to perform their respective functions repeatedly, whereby the first and second integrators respectively generate a series of sine values representative of the sine wave and a series of cosine values representative of the cosine wave;

a seed generator for generating a first seed and a second seed from a predetermined sampling frequency value and a desired frequency value;

wherein the feedback generator is adapted to generate the negative feedback value using the first and second seed value, and the second negative feedback generator is adapted to generate the second negative feedback value using the first and second seed values such that the first and second seed values cause the sine wave and the cosine wave to have a common frequency equal to the desired frequency value.

14. The system of claim 13, wherein the next sine value is a floating point number having an N-bit amplitude-mantissa field, the next sine value having an amplitude within a least significant-bit of the N-bit fields as result of generating a magnitude value equal to a sum of the squares of the sine value and the cosine value, generating a negative feedback value as a function of the sine wave, the cosine value, and the magnitude value and generating a next sine value using the sine value and the negative feedback value, whereby the next sine value represents part of a sine wave.

15. The computer claim of claim 12, wherein the fifth computer readable program code is adapted to generate the second negative feedback value using the first and second values such that the first and second values cause the sine wave and the cosine wave to have a common frequency equal to the desired value.

* * * * *